United States Patent [19]

Nogueira et al.

[11] Patent Number: 4,521,386

[45] Date of Patent: Jun. 4, 1985

[54] PROCEDURE FOR OBTAINING HIGH PURITY MAGNESIUM SALTS OR THEIR CONCENTRATE SOLUTIONS FROM SEA WATER, BRINE OR IMPURE MAGNESIUM SALT SOLUTIONS

[76] Inventors: Gustavo D. Nogueira, Daoiz y Velarde 7, Alcala de Henares (Madrid); Jose M. R. Vega, San Ernesto 12; Eduardo D. Nogueira, Avda. Mediterraneo 47, both of Madrid, all of Spain

[21] Appl. No.: 547,769

[22] Filed: Nov. 2, 1983

[30] Foreign Application Priority Data

Nov. 5, 1982 [ES] Spain .................................. 517149

[51] Int. Cl.³ ............................ C01F 5/00; C01F 1/00
[52] U.S. Cl. .................................... 423/157; 423/169
[58] Field of Search ................ 423/155, 157, 158, 169

[56] References Cited

U.S. PATENT DOCUMENTS

| 2,567,419 | 9/1951 | Bengtson | 423/155 |
| 4,051,223 | 9/1977 | MacKay | 423/157 |
| 4,430,227 | 2/1984 | Hanson et al. | 423/157 X |

FOREIGN PATENT DOCUMENTS

| 2850785 | 5/1979 | Fed. Rep. of Germany | 423/155 |
| 44-1683 | 1/1969 | Japan | 423/158 |

Primary Examiner—Donald R. Valentine
Attorney, Agent, or Firm—Goodman & Teitelbaum

[57] ABSTRACT

A process for the recovery of magnesium from sea water, brine or impure magnesium salt solutions using an extraction technique with solvents to obtain a concentrate and pure magnesium salt solution or a high purity crystallized magnesium salt. The process consists of two basic stages, high selectivity magnesium extraction and re-extraction with an organic phase as an intermediate vehicle.

15 Claims, 1 Drawing Figure

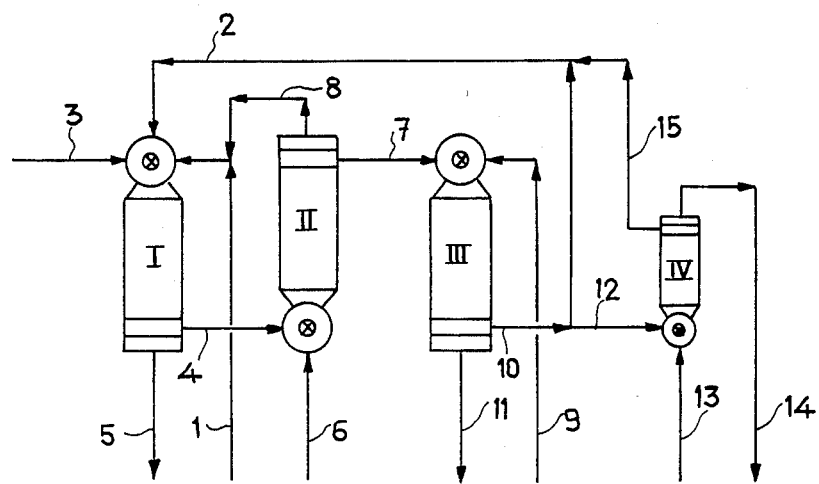

PROCEDURE FOR OBTAINING HIGH PURITY MAGNESIUM SALTS OR THEIR CONCENTRATE SOLUTIONS FROM SEA WATER, BRINE OR IMPURE MAGNESIUM SALT SOLUTIONS

A technology is being used at present in the recovery processes of magnesium from sea water or aqueous solutions of magnesium salts, based on the precipitation of magnesium hydroxide by adding an alkali normally calcium hydroxide. The poor solid liquid separation characteristics of a recently precipitated magnesium hydroxide are well known. The solids formed are fine, semi-coloidal and spongy, and their separation from liquid is difficult.

The object of this invention is the recovery of magnesium from sea water, brine or impure magnesium salt solutions using the extraction technique with solvents to obtain a concentrate and pure magnesium salt solution or a high purity crystallized magnesium salt.

If the final product is a concentrated and pure magnesium chloride solution, this would be suitable for feeding to any heat decomposition process of magnesium chloride in order to obtain refractory type magnesium oxide or crystallized hexahydrate magnesium chloride, whose quality would make it useful for feeding to salt electrolysis cells to obtain high purity metal magnesium.

The process consists of two basic stages, high selectivity magnesium extraction and re-extraction with an organic phase as the intermediate vehicle. The object of the invention having now been described, we will now describe the basics and characteristics of same.

The organic phase used in the extraction with solvents is formed by two components, one of which only is active, the object of which is as follows:

(1) Solvent. This is the predominant component of the organic phase and is used as the carrier and solvent of the extraction agent. It is formed by a petroleum distillate fraction assimilable to kerosene.
(2) Extraction agent. This may be any phosphor based organic acid, although basically it is 2-ethyl-hexyl-hydrogen-2 ethyl-hexyl-phosphonate acid, denominated hereinafter as HEH-(EHP). These re-agents act as liquid cation exchanges, and in this particular case they exchange magnesium for hydrogen ions. All the basics of the solvent extraction process are due to the reactions of these extraction agents, which behave like acids, and are essentially as described below.

To simplify the reactions, the organic acid will be represented by RH and the radical R will always be in the organic phase.

The reactions of the extraction of magnesium and impurities by the organic acid may be schematically shown as follows, $M^{n+}$ representing the heavy metals:

$$2RH + Mg^{2+} \rightleftharpoons R_2Mg + 2H^+ \quad (1)$$

$$2RH + Ca^{2+} \rightleftharpoons R_2Ca + 2H^+ \quad (2)$$

$$nRH + M^{n+} \rightleftharpoons R_nM + nH^+ \quad (3)$$

The extraction of each cation depends on the equilibrium pH and the extraction sequence is heavy metals, magnesium calcium.

For a complete magnesium extraction it is necessary to displace reactions (1) to the right which is achieved by neutralizing the hydrogen ions produced with an alkali.

Owing to the sequence of the extraction, one, all the magnesium has been extracted, the few heavy metals (normally iron) have also been co-extracted as well as a small amount of calcium, reactions (2) and (3).

In order to eliminate the co-extracted calcium, a washing stage is used where an exchange reaction of the calcium extracted in the organic phase with the magnesium contained in the aqueous phase, as shown by the following reaction:

$$R_2Ca + Mg^{2+} \rightleftharpoons R_2Mg + Ca^{2+} \quad (4)$$

This reaction is due to two causes: One, the sequence of extraction favours the magnesium as against the calcium and two, the equilibrium pH of this stage is below that of the calcium extraction and above that of the magnesium extraction.

In the magnesium re-extraction stage, reaction (1) is produced and is displaced to the left thanks to the addition of one acid. The magnesium is exchanged by hydrogen ions and the addition of acid is controlled in order to maintain the pH. In this way, reaction (3) is prevented from being displaced to the left during this stage, which would produce the re-extraction of the few heavy metals together with the magnesium, thus the product obtained would be impure.

To prevent the heavy metals from accumulating during the organic phase, a regeneration stage of the organic phase has been arranged so that a fraction of the organic phase may be treated with a strong concentrate acid thus displacing reaction (3) to the left. The heavy metals are exchanged for hydrogen ions. In this way, the concentration of heavy metals is kept, in the organic phase, below a value so as to ensure that the product is not contaminated.

All the above-mentioned stages, extraction, washing, magnesium re-extraction and regeneration, can be carried out in any extraction equipment with solvents and preferably in mixers-sedimentators.

The contact time in both phases depends on the concentrations during the organic and aqueous phases and of the degree of agitation. In any case, it is lower than 5 minutes.

The temperature required for the process varies between 10° and 90° C.

The concentrations of the extraction agent in the organic phase depend upon the nature of the water solution, raw material and contents of magnesium and impurities, and may vary between 2 and 50% (v/v).

Any acid can be used in the magnesium re-extraction provided it is stronger than the organic acid used as the extraction agent. Each choice and concentration depend on the purified magnesium salt required.

Use can also be made of water solutions of acid and magnesium salt corresponding to the acid anion used for the magnesium re-extraction such as the mother liquors obtained in the crystallization of the magnesium salt by the effect of the common ion, by adding acid.

The acid used in the regeneration of the organic phase may be any strong concentrated inorganic acid, preferably high concentrate hydrochloric acid, preferably 6±2 molar.

The single FIGURE of the drawing shows a simplified scheme of the basic technology, according to the present invention, where the following stages and currents can be identified:

STAGE I—Magnesium extraction
STAGE II—Washing
STAGE III—Selective magnesium re-extraction
STAGE IV—Organic phase regeneration Current
1. Feeding of raw material
2. Organic phase fed at extraction stage
3. Alkali at extraction stage.
4. Organic extract unwashed
5. Aqueous refined product from extraction
6. Washing solution
7. Washed organic extract
8. Aqueous solution produced during the washing
9. Acid solution at magnesium re-extraction
10. Organic solution discharged from magnesium
11. Pure and concentrate magnesium salt solution
12. Organic fraction at regeneration
13. Concentrate acid at regeneration
14. Aqueous solution after heavy metal re-extraction
15. Regenerated organic solution.

Each of the above stages are described below.

The aqueous solution of impure magnesium salts (sea water, brine water, etc.), previously treated by chloration and filtration to eliminate the bio-matter and solids in suspension (current 1) is sent to extraction (Stage I) where in three or four counter current divisions with the organic phase (current 2) and by adding an alkali (current 3), normally lime milk at a controlled pH, in the second division mixer of this stage, the passing of the $Mg^{2+}$ ions from the aqueous to the organic phase takes place in accordance with reaction (1).

The aqueous phase from the extraction (current 5) with low magnesium content, can be drained into the sea without any further treatment.

The magnesium charge organic phase (current 4) goes on to the washing stage (Stage II) which consists of two of the counter current divisions, where it comes into contact with an aqueous solution (current 6) of a magnesium salt with a concentration of magnesium higher than 5 g/l. In this way all aqueous carryover which may be contained by the organic extract is eliminated, and the exchange of the small fraction of co-extracted calcium in the organic extract by the magnesium of the aqueous phase takes place in accordance with reaction (4), thus producing an aqueous phase from the washing (current 8) which is incorporated to the extraction stage, and a washed organic extract (current 7).

The organic extract obtained in the washing stage (current 7) goes on to the magnesium re-extraction stage (Stage III) which consists of one or two counter current divisions, where it comes into contact with the pH controlled acid solution from the re-extraction (current 9), thus the $Mg^{2+}$ ions from the organic phase are passed to the aqueous phase selectively and a pure concentrate magnesium salt aqueous solution (current 11) and an organic phase free from magnesium (current 10) are produced.

A small fraction of the organic refined product obtained in the magnesium re-extraction stage (current 12) goes on to a regeneration stage (Stage IV) which consists of one division, where it comes into contact with a small amount of high concentrate acid (current 13), the heavy metals pass then from the organic to the aqueous phase and an aqueous phase is produced which contains the heavy metals (current 14) as well as a regenerate organic phase (current 15) which together with the non-regenerate organic phase are recycled for extraction (current 2).

The pure magnesium salt aqueous solution (current 11) may be processed in several forms depending on the final product required.

If a crystallized salt is required, use can then be made of an evaporator, crystallizer and solid-liquid separation equipment and the mother liquors may be recycled at the magnesium re-extraction stage. If the crystallization is by common ion effect and acid addition, then a crystallizer and solid-liquid separation equipment are required. The mother liquors are recycled similarly as in the re-extraction stage.

If magnesium oxide is required then hydrochloric acid is used for the re-extraction, and the magnesium chloride solution obtained may be used as feed on any halogenide pyrohydrolysis process, in which, in addition to the magnesium oxide, hydrochloric acid is produced which is recycled at the magnesium re-extraction stage with the subsequent saving in re-agents.

Below we give a few non-limitative examples in order to illustrate the basis of the process, as well as its technological application to the recovery of magnesium from sea water.

The utilization of other raw materials, higher magnesium concentrate solutions, do not affect the basic scheme of the process but would only require the increase in the concentration of the extraction agent at the organic phase and the increase in the organic/aqueous stream ratio.

EXAMPLE 1

Magnesium extraction by different organic reagents at different pH values.
 Variables: Extraction agent and pH value.
 Initial aqueous phase: NaCl 30 g/l and $MgCl_2$ 13 g/l.
 Organic phase: 10% (v/v) organic acid in kerosene.
 Organic/Aqueous ratio: 1/1
 Alkali: NaOH 2N
 Temperature: Ambient 20°–25° C.

The results obtained are given in Table 1.

TABLE 1

| Test No. | Extraction Agent | pH | Extraction % |
|---|---|---|---|
| 1 | di-2-ethyl-hexyl phosphor acid ($D_2$EHPA) | 5 | 77 |
| 2 | $D_2$EHPA | 6 | 94 |
| 3 | $D_2$EHPA | 7 | 100 |
| 4 | Phosphonate ethyl-hexyl-hydrogen-ethyl-hexyl acid. | 5 | 68 |
| 5 | HEH (EHP) | 6 | 93 |
| 6 | HEH (EHP) | 7 | 100 |

The above shows the extraction capacity of the phosphor based organic acids.

EXAMPLE 2

Selective extraction of magnesium as against calcium as a function of the pH value.
 Variable: pH value
 Equilibrium aqueous phase: NaCl 30 g/l, $MgCl_2$ 2 g/l and $CaCl_2$ 5 g/l.
 Organic phase: HEH-(EHP) 9% (v/v) in kerosene.
 Organic/aqueous ratio: 1/1
 Temperature: Ambient 20°–25° C.

The results are given in Table 2 and are expressed as a factor of separation as defined in accordance with the following quotient:

$$\alpha Mg/Ca = D_{Mg}/D_{Ca}$$

where D is the distribution coefficient calculated as the quotient between the metal concentration in the organic phase and in the aqueous phase, both in equilibrium.

TABLE 2

| Test No. | Equilibrium pH | Separation Factor αMg/Ca |
|---|---|---|
| 1 | 5.5 | 1 |
| 2 | 6 | 5 |
| 3 | 6.5 | 22 |

The separation factor increases with the extraction pH and therefore it is possible to extract selectively the magnesium from raw material contaminated with calcium or make use of an alkali such as lime milk.

EXAMPLE 3

Extraction of magnesium from solutions at different concentrations.
  Variable: Concentration of magnesium at initial aqueous phase.
  Aqueous phase: NaCl 30 g/l, common to all.
  Organic/aqueous ratio: 1/1
  Alkali: NaOH 2N
  Equilibrium pH: 7
  Temperature: Ambient 20°–25° C.

The results are given in the following Table 3.

Organic/aqueous ratio: 1/3
  Equilibrium pH: 6.5
  Temperature: Ambient 20°–25° C.

The results are given in Table 4.

TABLE 4

| Test No. | Alkali used | Alkali Consumption Alkali Kg Kg Mg extracted | Alkali equivalent Extracted Mg equivalent |
|---|---|---|---|
| 1 | NaOH (solution 2N) | 3.3 | 1 |
| 2 | Ca(OH)₂ (lime milk 20%). | 3.2 | 1.05 |

EXAMPLE 5

Magnesium re-extraction with different acid solutions.
  Variable: Composition of re-extraction aqueous phase.
  Organic phase: HEH-(EHP) 10% (v/v) in kerosene.
  Organic extract: Mg 3.5 g/l.
  Temperature: Ambient 20°–25° C.

The results are given in Table 5.

Any strong acid or acid and magnesium salt solution may be used for re-extracting quantitatively the magnesium from the organic phase.

The magnesium concentrations in the final aqueous extract are sufficiently high to crystallize the relevant salts. By varying the organic/aqueous ratio it is possible to obtain a product practically saturated in the salt corresponding to the acid used. Tests 2, 3 and 4 correspond to re-extraction with acid crystallizing mother liquors.

TABLE 5

| TEST No. | Re-extraction Aqueous Phase Composition Acid Nature | g/l | Salt Nature | g/l | Organic/ Aqueous Ratio | Mg % Re-extracted | Final Aqueous Composition Mg g/l | (Free Acid) g/l |
|---|---|---|---|---|---|---|---|---|
| 1 | HCl | 312 | — | — | 30 | 99.0 | 104 | <1 |
| 2 | HCl | 105 | MgCl₂ | 297 | 10 | 99.3 | 110.5 | <1 |
| 3 | H₂SO₄ | 100 | MgSO₄ | 183 | 4 | >99.9 | 51 | 44 |
| 4 | HNO₃ | 126 | Mg(NO₃)₂ | 451 | 4 | >99.9 | 88 | 53 |

TABLE 3

| Test | Initial Aqueous (Mg) g/l | Organic Phase (HEH (EHP)) % v/v | Final Aqueous Phase (Mg) g/l | Final Organic Phase (Mg) g/l | Extraction Efficiency % |
|---|---|---|---|---|---|
| 1 | 1.6 | 5 | 0.1 | 1.5 | 94 |
| 2 | 3.5 | 10 | 0.1 | 3.4 | 97 |
| 3 | 5.4 | 15 | 0.1 | 5.3 | 98 |
| 4 | 7.5 | 20 | 0.1 | 7.4 | 99 |

For treating magnesium solutions at different concentrations it is necessary to vary the concentration of the extraction agent at the organic phase. In any case, high extraction efficiencies may be obtained.

EXAMPLE 4

From alkalis.
  Variable: Alkali used in the magnesium extraction stage.
  Organic phase:
    Extraction agent: HEH (EHP)
    Concentration: 10% (v/v)
    Solvent: Kerosene
  Initial aqueous phase: NaCl 30 g/l, MgCl₂ 5 g/l.

EXAMPLE 6

Selectivity in the re-extraction of magnesium as against iron as a function of the pH value.
  Variable: pH value
  Organic phase: HEH-(EHP) 10% (v/v) in kerosene.
  Organic extract:
    Mg: 3.3 g/l
    Fe: 0.31 g/l
  Re-extraction aqueous phase:
    Mg 82 g/l as MgCl₂
    HCl 53 g/l
    Fe 0.008 g/l as FeCl₃
  Temperature: Ambient 20°–25° C.

A volume of organic extract is put into contact with various quantities of re-extraction aqueous phase. The equilibrium results are given in Table 6.

TABLE 6

| TEST No. | Composition of Phases in Equilibrium g/l Aqueous Phase Mg | Fe | pH | Organic Phase Mg | Fe |
|---|---|---|---|---|---|
| 1 | 98 | 0.002 | 1.8 | 0.53 | 0.31 |
| 2 | 100 | 0.002 | 1.25 | 0.40 | 0.31 |
| 3 | 98 | 0.015 | 0.2 | 0.13 | 0.31 |

TABLE 6-continued

| TEST | Composition of Phases in Equilibrium g/l | | | | |
|---|---|---|---|---|---|
| | Aqueous Phase | | | Organic Phase | |
| No. | Mg | Fe | pH | Mg | Fe |
| 4 | 98 | 0.025 | 0 | 0.05 | 0.30 |

As it will be seen the re-extraction of Fe starts below 1.25 pH. Therefore, the pH required for selective re-extraction of a highly pure product must be higher than 1.

EXAMPLE 7

Complete technology.

Experimentation was carried out in a pilot plant. The above tests and the quality of the product obtained were confirmed. In order to facilitate the identification of the various currents use shall be made of the diagram on FIG. 1.

Conditions

Raw Material: Sea water
Number of extraction division (Stage I): 3
Number of washing division (Stage II): 2
Number of magnesium re-extraction division (Stage III): 2
Number of heavy metal re-extraction division (Stage IV): 1
Dwell time in each mixer: 3 minutes
Temperature: Ambient, 20°-25° C.
Organic reagent:
  Type: HEH (EHP)
  Concentration: 10% (v/v)
  Solvent: Kerosene
Extraction pH: 6.5
Magnesium re-extraction pH: 2.

The analytical results together with the operating streams of one of the samples carried out with the process under stationary regime are summed up in Table 7.

TABLE 7

| CONCENTRA- TION g/l | CURRENT NO. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | FLOW ml/min | | | | | | | | | | | | | | |
| | 770 | 220 | 12 | 220 | 790 | 7.5 | 220 | 7.5 | 20 | 220 | 22 | 20 | 2 | 2 | 20 |
| Mg | 1.23 | — | — | 3.29 | 0.43 | 14.7 | 3.36 | 14 | 84 | 0.002 | 110 | 0.002 | — | 0.02 | <0.001 |
| Ca | 0.42 | — | 100 | 0.05 | 1.90 | 0.12 | 0.005 | 1.25 | 0.01 | — | 0.05 | — | — | — | — |
| K | 0.45 | — | — | — | 0.44 | — | <0.001 | — | 0.005 | — | <0.005 | — | — | — | — |
| Cl$^-$ | 20 | — | — | — | 19 | 44 | — | 43 | 350 | — | 318 | — | — | — | — |
| SO$_4$= | 2.75 | — | — | — | 2.7 | — | — | — | — | — | — | — | — | — | — |
| HCl | — | — | — | — | — | — | — | — | 110 | — | — | — | 220 | 216 | — |
| Fe | 0.001 | 0.30 | 0.2 | 0.314 | — | — | 0.313 | — | — | 0.315 | 0.001 | 0.315 | — | 1.7 | 0.15 |
| pH | 7 | — | — | — | 2.76 | 1.18 | — | 5.40 | — | — | 2 | — | — | — | — |

As it can be gathered, the recovery of magnesium has been carried out with an efficiency higher than 60%. If a higher efficiency is required, then the organic/aqueous ratio should be increased.

The consumption of lime is confirmed as not exceeding 1.1 calcium equivalent per recovered magnesium equivalent.

The quality and concentration of the product obtained (current 11) will allow a high purity crystallized salt MgCl$_2$.6H$_2$O to be obtained.

What is claimed is:

1. Process for obtaining high purity magnesium salts or concentrate solutions from a liquid, raw material such as sea water, brine water or impure magnesium salt solutions, consisting in:
  a treatment stage of the liquid, raw material by chloration and filtration;
  followed by an extraction stage of magnesium from the liquid treated in the treatment stage, by placing same in contact with an organic solution containing an extraction agent belonging to a phosphor based organic acid group, the magnesium being exchanged by hydrogen ions which are neutralized by an addition of an alkali, until a required pH is reached, thus producing:
    an organic extract containing the magnesium and some impurities,
    as well as a first aqueous solution with low magnesium content;
  followed by a washing stage where the magnesium organic extract is put into contact with a second aqueous solution having a concentration of magnesium, in order to exchange a co-extracted calcium fraction from the organic extract by the magnesium from the second aqueous solution thus producing:
    a washed organic extract which contains the magnesium but no calcium,
    and a third aqueous solution which is then incorporated to the extraction stage;
  followed by a magnesium re-extraction stage where the washed organic magnesium extract comes into contact with a pure acid or with a solution of the acid with the salt corresponding to the magnesium, at controlled pH, producing:
    an organic refined product practically free from magnesium but which contains a small amount of heavy metal,
    and a concentrate aqueous solution with high purity magnesium salt corresponding to anion of the acid used;
  followed by a regeneration stage where a fraction of the organic refined product comes into contact with a concentrate acid producing:
    a discharged organic solution which together with the non-regenerated fraction of the organic refined product are recycled in the extraction stage,
    and acid aqueous solution containing the heavy metals; and
  a crystallization stage of the concentrate magnesium solution by evaporating excess water, or by common ion effect with an addition of acid, to obtain:
    a crystalline pure magnesium salt,
    and mother liquors which are recycled in the re-extraction stage.

2. Process for obtaining high purity magnesium salt or concentrate solutions, as per claim 1, in which the treatment stage of the magnesium salt solution, raw material, must consist of an adequate chloration to leave it free from bio matter plus filtration to leave it free from solids in suspension, preferably below 50 ppm.

3. Process for obtaining high purity magnesium salts or concentrate solutions as per claim 1, in which the extraction agent is an organic acid from the phosphor group such as phosphoric, alkyl acids, phosphonic alkyl acids, organic mono esters from the phosphonic and phosphinic alkyls, with a molecular weight higher than 150, and preferably the 2-ethyl-hexyl-hydrogen-2-ethyl-hexyl-phosphonate acid.

4. Process for obtaining high purity magnesium salts or concentrate solutions, as per claim 3, in which the organic solution is composed of the phosphor based organic acid diluted in aliphatic, aromatic hydro-carbons or their mixture such as kerosene, in a concentration between 2 and 50% but preferably 10% in volume.

5. Process for obtaining high purity magnesium salts or concentrate solutions, as per claim 1, in which the organic solution is composed of the phosphor based organic acid diluted in aliphatic, aromatic hydrocarbons or their mixture such as kerosene, in a concentration between 2 and 50% but preferably 10% in volume.

6. Process for obtaining high purity magnesium salts or concentrate solutions as per claim 1, in which the alkalis used in the magnesium extraction stage are lime milk or solutions of hydroxides, oxides or carbonates of the alkaline and alkaline-earth metals, and preferably lime milk at 20±10%.

7. Process for obtaining high purity magnesium salts or concentrate solutions as per claim 6, in which the pH required so as to recover more than 60% of the magnesium contained in the raw material at the extraction stage, is controlled at between 4 and 8 but preferably 6.5.

8. Process for obtaining high purity magnesium salts or concentrate solutions, as per claim 1, in which the pH required so as to recover more than 60% of the magnesium contained in the raw material at the extraction stage, is controlled at between 4 and 8 but preferably 6.5.

9. Process for obtaining high purity magnesium salts or concentrate solutions, as per claim 1, in which the second aqueous solution used in the washing stage of the organic impure magnesium extract is an aqueous solution of any magnesium salt such as magnesium chloride, magnesium sulphate, magnesium nitrate or magnesium phosphate, but preferably magnesium chloride dissolved in water at a magnesium concentration higher than 5 g/l.

10. Process for obtaining high purity magnesium salts or concentrate solutions, as per claim 1, in which the acid used for the re-extraction stage of the washed organic extract is any acid, whether concentrated or in aqueous solution only or together with the corresponding magnesium salt such as sulphuric acid, hydrochloric acid, nitric acid and phosphoric acid, but preferably hydrochloric acid at a concentration higher than 10% or a solution of hydrochloric acid and magnesium chloride at a chloride concentration higher than 100 g/l.

11. Process for obtaining high purity magnesium salts or concentrate solutions, as per claim 10, in which the pH at the magnesium re-extraction stage, required to obtain a high purity product, is controlled at between 1 and 4, and preferably 2.

12. Process for obtaining high purity magnesium salts or concentrate solutions, as per claim 1, in which the pH at the magnesium re-extraction stage, required to obtain a high purity product, is controlled at between 1 and 4, and preferably 2.

13. Process for obtaining high purity magnesium salts or concentrate solutions, as per claim 1, in which during the regeneration stage of the fraction of the organic refined product containing the heavy metals comes into contact with a concentrate acid such as sulphuric acid, nitric acid and hydrochloric acid, and preferably hydrochloric acid 6±2 normal.

14. Process for obtaining high purity magnesium salts or concentrate solutions, as per claim 13, in which the fraction of regenerated organic refined product is sufficient to keep a low concentration of heavy metal in organic refined product and can be controlled at between 5 and 50% of the total flow of the organic refined product and preferably at 10%.

15. Process for obtaining high purity magnesium salts or concentrate solutions, as per claim 1, in which the fraction of regenerated organic refined product is sufficient to keep a low concentration of heavy metal in organic refined product and can be controlled at between 5 and 50% of the total flow of the organic refined product and preferably at 10%.

* * * * *